Figure 1:
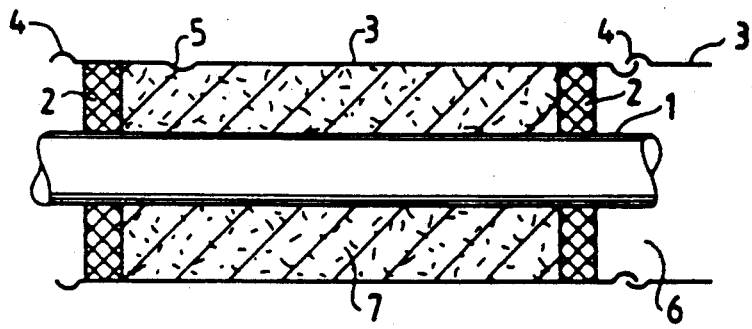

United States Patent [19]

Zemanek et al.

[11] Patent Number: 5,017,314

[45] Date of Patent: May 21, 1991

[54] PROCESS FOR PRODUCING SHELLS, MOLDINGS AND A DETACHABLE INSULATION

[75] Inventors: Jiri Zemanek, Munich; Manfred Timpert, Schermbeck; Karl Rudolph, Bottrop, all of Fed. Rep. of Germany

[73] Assignee: Rheinhold & Mahla GmbH, Fed. Rep. of Germany

[21] Appl. No.: 360,470

[22] Filed: Jun. 2, 1989

[30] Foreign Application Priority Data

Jun. 6, 1988 [DE] Fed. Rep. of Germany ....... 3819229

[51] Int. Cl.$^5$ .................. B28B 1/16; B28B 1/30; B32B 35/00
[52] U.S. Cl. ...................... 264/35; 264/31; 264/36; 264/112; 264/118; 264/159; 264/163
[58] Field of Search .................. 264/31–35, 264/138, 36, 157, 159, 163, 254, 255, 256, 257, 279, 112, 118

[56] References Cited

U.S. PATENT DOCUMENTS

| | | | |
|---|---|---|---|
| 2,119,415 | 5/1938 | Bodge | 249/173 |
| 2,284,439 | 5/1942 | MacArthur et al. | 264/254 X |
| 2,707,984 | 5/1955 | Goff | 264/35 |
| 3,380,258 | 4/1968 | Young | 264/35 |
| 3,616,516 | 11/1971 | Corriston | 264/32 X |

FOREIGN PATENT DOCUMENTS

| | | |
|---|---|---|
| 0106390 | 6/1986 | European Pat. Off. . |
| 3718930 | 12/1988 | Fed. Rep. of Germany . |
| 2465947 | 3/1981 | France . |
| 561388 | 4/1975 | Switzerland . |
| 352640 | 7/1931 | United Kingdom . |

Primary Examiner—Jan H. Silbaugh
Assistant Examiner—Karen D. Kutach
Attorney, Agent, or Firm—Eckert Seamans Cherin & Mellott

[57] ABSTRACT

A process for producing a detachable insulation for inaccessible hollow spaces on warm installations of pipelines, fittings, and containers includes the steps of surrounding the installation with a sheet metal jacket, supporting the sheet metal jacket at a spaced location from the installation in order to form a hollow space between the sheet metal jacket and the installation, filling the hollow space through an opening in the sheet metal jacket with free-flowing insulating material and a binder, curing the binder to form a rigid insulating shell, removing the sheet metal jacket, and cutting the insulating shell by appropriate axial and radial cuts to form individually removable insulation sections.

9 Claims, 1 Drawing Sheet

PROCESS FOR PRODUCING SHELLS, MOLDINGS AND A DETACHABLE INSULATION

The present invention pertains to a process for producing a detachable insulation for inaccessible hollow spaces of warm installations, especially pipelines and their components, fittings and containers which are surrounded by an external sheet metal jacket at a spaced location.

It is known that warm installations, e.g., pipelines of steam or product lines, can be insulated by wrapping the pipeline with mats of insulating material between individual spacers, after which these [mats]are tied and an external sheet metal jacket is placed over them. It is essential in such an insulation that the interspaces or annular spaces between the pipeline and the external sheet metal jacket are completely filled. Any imaginable insulation thickness can be selected in practice and it is possible to produce a jointless insulation system.

Another possibility of insulation is to fill the hollow spaces left between the pipeline and the external sheet metal jacket with foam according to the in-situ foam method. However, this method is applicable only up to certain temperatures.

It had also been proposed that these hollow spaces should be filled with free-flowing insulating materials by blowing same in, as a result of which even poorly accessible hollow spaces can be filled reliably. However, one disadvantage of this method is the fact that if it becomes necessary to remove this insulation, the insulation will generally be lost; another disadvantage is that it is difficult to apply this insulation in such poorly accessible, e.g., very high, pipelines or apparatus parts.

Therefore, the basic task of the present invention is to provide an insulation which is easy to prepare, on the one hand, and if removal becomes necessary, it can subsequently be reused or it can be used in other places in the case of geometric similarity, on the other hand.

To accomplish this task, it is proposed according to the present invention that the hollow space between the installation to be insulated and the external detachable sheet metal jacket should be filled with a free-flowing insulating material that consists of fine particles, preferably fibrous, and a heat-resistant, curable binder that wets the insulating material.

It is particularly favorable to blow the insulating material together with the binder into the hollow space via appropriate openings provided in the sheet metal jacket.

In such an insulation, in which the insulating material is mixed with a binder that wets the insulating material prior to or simultaneously with its introduction into the hollow space, a rigid insulating shell, which is relatively loose, corresponding to the material selected, and has good insulating effect, is obtained after curing.

In a modified variant of the present invention, the solidified insulation can be subdivided into removable moldings by appropriate axial and, if desired, radial cuts, after curing of the binder and removal of the sheet metal jacket.

This leads to the essential advantage of such an insulation that it is very easily detachable and is subsequently reusable, or that such insulating moldings can be prepared even in readily accessible places which can subsequently be installed in otherwise poorly accessible places of equal insulation volume geometry.

In the case of a pipeline to be insulated, a section between two ring-shaped spacers placed on the pipeline is preferably filled separately with the insulating material and the binder.

In the case of a fitting or flange to be insulated, it is advantageous to first cover the section to be insulated between two pipeline insulation sections partitioned at the end faces with a glass fabric and to subsequently fill the hollow space between the glass fabric and the sheet metal jacket with insulation.

In the case of a container head to be insulated, a ring-shaped spacer can be placed under the container dome at the cylindrical part of the container, and the hollow space left between the dome of the container and the sheet metal jacket can subsequently be filled with insulating material and binder.

A fibrous material consisting of relatively short fibers or granulated mineral wool in the form of granular rock wool or granular glass fibers or a similar material is preferably used as the insulating material. However, it is also possible to use perlites or vermiculites as the insulating material.

Water glass is especially suitable for use as the binder. However, it is also possible to use other rapidly curing and heat-resistant binders or adhesives.

Figure 2:
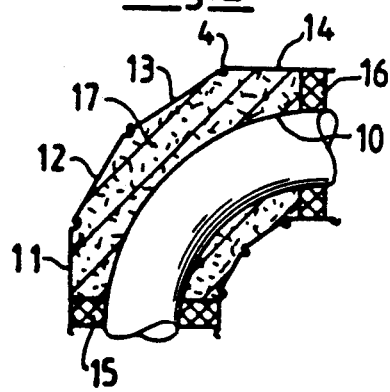
Figure 3:
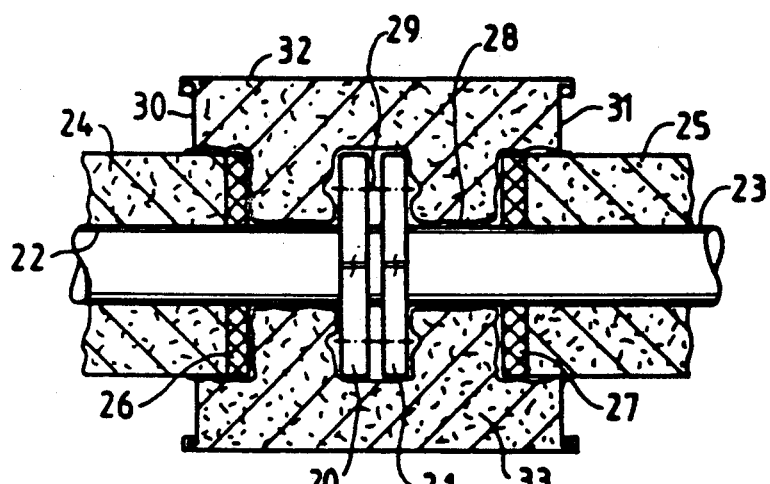
Figure 4:
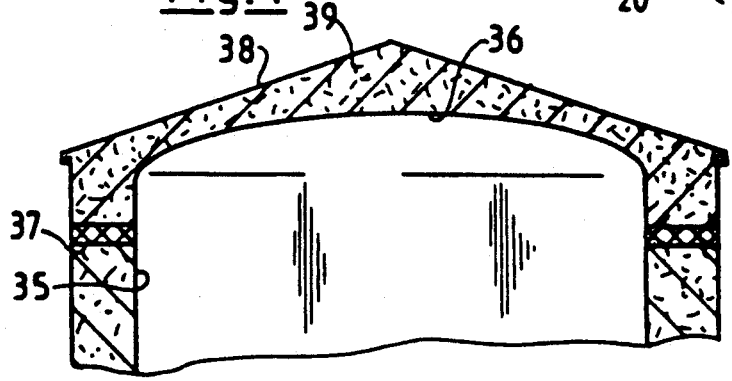

Parts of installations insulated according to the process described in the present invention are explained in greater detail in examples based on a schematic drawing. In the drawing, FIG. 1 shows a longitudinal section through an insulated pipeline, FIG. 2 shows the corresponding insulation of a pipe elbow, FIG. 3 shows a longitudinal section through the flange section of a pipeline with the insulation in place, and FIG. 4 shows the insulation of a container head.

As is apparent from FIG. 1, ring-shaped spacers 2, which may consist, e.g., of mineral fiber disks or metal or ceramic webs, are placed on a pipeline 1 at predetermined spaced locations. An external sheet metal jacket 3, which may consist of individual courses of a length approximately corresponding to the distance between two spacers 2, is subsequently placed over the said spacers 2, and the individual sheet metal jackets 3 are connected to each other via appropriate beads 4. This sheet metal jacket 3 is now provided in an appropriate point with a closable hole 5, which is preferably slightly larger than the external diameter of the blow nozzle of a blowing machine (not shown).

An insulating material 7 consisting of small particles, which is mixed with a binder, is blown via the said hole 5 into the hollow space 6 between the pipeline 1 to be insulated, the external sheet metal jacket 3 and the two lateral spacers 2. This insulating material may consist of mineral wool fibers or granular mineral wool, e.g., rock wool fibers or glass fibers or granular products of these minerals, or of perlites or vermiculites, which are wetted with water glass used as the binder prior to or during blowing in. After the hollow space 6 has been fully packed and filled—the amount of insulating material needed for an actual hollow space can be calculated beforehand—a loose, but rigid insulating shell is formed after curing of the binder. Since the individual fibers or particles of the insulating material are wetted with binder or adhesives only on their surface, there are only point connections between the individual fibers or particles of the insulating material, so that air-interspersed filling of the corresponding hollow space will be the same as without binder.

The great advantage of a solidified insulating shell thus obtained is the fact that after removal of the sheet metal jacket 3 and cutting of the insulation 7 by appropriate radial and axial cuts, the insulation can be removed as individual moldings, so that this insulation can be put back in place and consequently reused after repair of the pipeline.

Another essential advantage is the fact that it is thus possible to manufacture insulating moldings in readily accessible places and to install these moldings in otherwise poorly accessible places of identical geometry, as a result of which the insulation installation is considerably facilitated.

FIG. 2 shows the insulation of a corresponding pipe elbow 10. The corresponding sheet metal jacket is subdivided here, e.g., into four cylindrical upper courses 11, 12, 13 and 14 with correspondingly oblique end faces, which are locked with each other via appropriate beads 4. The hollow space 17 remaining between the pipe elbow 10 and the courses 11-14 of the sheet metal jacket, as well as the spacers 15 and 16, is subsequently filled in the same manner with insulating material consisting of small particles, which is mixed with binder. It is possible to produce appropriate moldings for reinstallation in another place after curing of the binder in this case as well.

The process according to the present invention is also particularly advantageous in the case of the insulation of fittings or flanges in pipelines, as is shown in FIG. 3 based on the example of a pipe coupling. The area of the pipelines 22 and 23 connected to each other via flanges 20 and 21 is to be insulated here. Up to a short distance from the flanges 20 and 21, the pipelines 22 and 23 are already insulated with appropriate insulation 24 and 25, which is partitioned on the end face with rigid disks or spacers 26 and 27. The remaining free section of the pipelines 22 and 23, as well as of the flanges 20 and 21, is first covered with a glass fabric 28, especially to keep the area of the flange connections 29 clean and to guarantee easy and simple removal. A sheet metal jacket, made of two or more parts and consisting of end disks 30 and 31, as well as the radially external shell, is subsequently placed over the insulations 24 and 25. The lateral ends of the glass fabric 28 can be tensioned by the rings 30 and 31 and held such as to ensure sealing.

The hollow space thus created between the glass fabric 28 and the two disks 30 and 31, as well as the radially external sheet metal jacket 32, is filled with an insulation 33 consisting of an insulating material mixed with binder, and it [the insulation] is left in place at least until complete curing. Moldings of particularly complex shape made of solidified insulating material can be obtained in this case as well, and these moldings can be used in another place of equal configuration.

Finally, FIG. 4 shows another example illustrating the corresponding insulation of a container head. Such a container head usually consists of the cylindrical section 35 of the container, to which is welded an arched container dome 36. To insulate this upper section, a ring-shaped spacer 37 is first placed in the zone of the upper end of the cylindrical part 35 of the container. The hollow space left between the container dome 36 and the sheet metal cover 38, which is, e.g., conical, is subsequently filled in the same way with an insulation 39 consisting of an insulating material that can be solidified with binder and is allowed to cure.

The examples described only show a few of the possibilities of designing such a solidifying insulation, which can subsequently be used in the form of moldings in other places. This process can be employed theoretically in all inaccessible hollow spaces of warm installations which require a corresponding insulation.

What is claimed is:

1. A process for producing a detachable insulation for inaccessible hollow spaces on warm installations of pipelines, fittings and containers, comprising the steps of:
   surrounding a first readily accessible portion of the installation with a sheet metal jacket;
   supporting the sheet metal jacket at a spaced location from the first portion of the installation by means defining ends of a hollow space formed between the sheet metal jacket and the first portion of the installation;
   filling the hollow space through at least one opening in the sheet metal jacket with free-flowing insulating material comprising small particles and a heat-resistant curable binder for moistening the small particles;
   curing the binder to form a rigid insulating shell; removing the sheet metal jacket; and,
   cutting the insulating shell by appropriate axial and radial cuts to form individually detachable insulation sections and removing the sections from the first portion of the installation for transfer to the inaccessible hollow spaces of equal configuration on the installation.

2. The process according to claim 1 wherein the supporting means comprises at least one ring-shaped spacer between the sheet metal jacket and the installation.

3. The process according to claim 1 further comprising the step of covering flanges or fittings in the installation with a glass fabric to define an inner boundary of the hollow space.

4. The process according to claim 3 wherein at least one end of the hollow space is partially defined by a ring-shaped spacer defining an end of an adjacent hollow space.

5. The process according to claim 1 wherein the small particles are mineral wool fibers.

6. The process according to claim 1 wherein the small particles are granular mineral wool.

7. The process according to claim 1 wherein the small particles are perlite.

8. The process according to claim 1 wherein the small particles are vermiculite.

9. The process according to claim 1 wherein the binder is water glass.

* * * * *